(12) United States Patent
Bryan

(10) Patent No.: US 12,005,946 B2
(45) Date of Patent: Jun. 11, 2024

(54) CANVAS LAUNDROMAT HAMPER FOR SHOPPING CART

(71) Applicant: Lorna Bryan, New York, NY (US)

(72) Inventor: Lorna Bryan, New York, NY (US)

( * ) Notice: Subject to any disclaimer, the term of this patent is extended or adjusted under 35 U.S.C. 154(b) by 0 days.

(21) Appl. No.: 17/212,104

(22) Filed: Mar. 25, 2021

(65) Prior Publication Data
US 2023/0001972 A1 Jan. 5, 2023

(51) Int. Cl.
*B62B 3/00* (2006.01)
*D06F 95/00* (2006.01)

(52) U.S. Cl.
CPC ............ *B62B 3/003* (2013.01); *D06F 95/002* (2013.01); *B62B 2202/66* (2013.01)

(58) Field of Classification Search
CPC . B62B 3/003; B62B 2202/66; B62B 2202/22; B62B 3/002; B62B 3/106; B62B 2202/26; D06F 95/002; D06F 95/004
See application file for complete search history.

(56) References Cited

U.S. PATENT DOCUMENTS

| | | | | |
|---|---|---|---|---|
| 2,037,291 A * | 4/1936 | Waldmann | ................ | B62B 3/02 280/42 |
| 2,472,203 A * | 6/1949 | Friedmann | ................ | A45C 5/14 280/DIG. 3 |
| 2,720,902 A * | 10/1955 | Johnson | ................ | D06F 95/002 383/41 |
| 2,797,102 A * | 6/1957 | Adams | ................ | B62B 3/02 280/30 |
| 2,920,900 A * | 1/1960 | Best | ................ | B62B 1/12 248/153 |
| 3,286,752 A * | 11/1966 | Duryee, Jr. | ................ | D06F 95/004 220/9.3 |
| 4,337,966 A * | 7/1982 | Stevens | ................ | B62B 1/208 280/654 |
| 5,050,998 A * | 9/1991 | Wachtel | ................ | D06F 95/004 383/41 |
| 5,154,359 A * | 10/1992 | Junta | ................ | B62B 3/106 211/12 |
| 5,503,476 A * | 4/1996 | Hamdan | ................ | D06F 95/002 383/86.2 |

(Continued)

FOREIGN PATENT DOCUMENTS

| | | | | |
|---|---|---|---|---|
| AU | 2015318363 A1 * | 4/2017 | ............ | B62B 3/007 |
| BR | MU8701642 U2 * | 5/2000 | | |

(Continued)

*Primary Examiner* — James A Shriver, II
*Assistant Examiner* — Ian Bryce Shelton
(74) *Attorney, Agent, or Firm* — Briggs IP; Jeremy A. Briggs

(57) ABSTRACT

A Canvas Laundromat Hamper for Shopping Cart is disclosed within, wherein laundry is placed when extracted from the washing machine and dryer, respectively. Wherein the canvas hamper is attached to the shopping cart with flaps extending from the panels over the top periphery of the shopping cart and secure to the outer side of each of the panel, to be secured with buttons through buttonholes, midway from the top and inside the shopping cart, the canvas hamper ends, and at the four lower corners of the canvas hamper are fashion ropes looped through grommet/eyelets to be secure inside the shopping cart.

16 Claims, 3 Drawing Sheets

(56) References Cited

U.S. PATENT DOCUMENTS

| | | | | |
|---|---|---|---|---|
| 6,354,619 B1 * | 3/2002 | Kim | B62B 3/02 | 280/649 |
| 8,100,280 B1 * | 1/2012 | Hernandez | D06F 95/002 | 220/9.4 |
| 8,807,578 B1 * | 8/2014 | Huguley | B62B 3/1464 | 280/33.992 |
| 8,882,135 B1 * | 11/2014 | Chen | B62B 3/106 | 280/651 |
| 8,905,411 B1 * | 12/2014 | Blanton | B62B 3/106 | 280/47.35 |
| 9,145,154 B1 * | 9/2015 | Horowitz | B62B 5/0013 | |
| 9,428,206 B1 * | 8/2016 | Morton | B62B 5/00 | |
| 9,561,151 B2 * | 2/2017 | Opsetmoen | A45B 11/00 | |
| 10,850,758 B1 * | 12/2020 | Griffith | B62B 3/02 | |
| 10,864,932 B2 * | 12/2020 | Darvish | B62B 3/025 | |
| 11,040,736 B1 * | 6/2021 | Tejada | B62B 5/065 | |
| 2006/0237933 A1 * | 10/2006 | Suchecki | B62B 3/002 | 280/79.2 |
| 2009/0092342 A1 * | 4/2009 | Rolim de Oliveira | B62B 3/1464 | 383/7 |
| 2009/0250460 A1 * | 10/2009 | Chang | D06F 95/004 | 220/9.4 |
| 2010/0002960 A1 * | 1/2010 | Lasko | B62B 3/106 | 383/41 |
| 2016/0121916 A1 * | 5/2016 | Kassab Arabo | B62B 3/025 | 280/37 |
| 2016/0298287 A1 * | 10/2016 | Bedford | D06F 95/008 | |
| 2017/0030008 A1 * | 2/2017 | Calise | A45C 13/385 | |
| 2017/0152098 A1 * | 6/2017 | Chow | B65D 43/14 | |
| 2019/0092510 A1 * | 3/2019 | Ribbe | B65B 67/1238 | |
| 2020/0239054 A1 * | 7/2020 | Darvish | B62B 3/027 | |
| 2020/0315386 A1 * | 10/2020 | Choi | B62B 3/008 | |
| 2021/0179156 A1 * | 6/2021 | Wu | B62B 3/027 | |
| 2022/0194452 A1 * | 6/2022 | Ho | B62B 3/025 | |

FOREIGN PATENT DOCUMENTS

| | | | | |
|---|---|---|---|---|
| CA | 2576548 A1 * | 8/2008 | | B62B 3/027 |
| GB | 2326085 A * | 12/1998 | | D06F 95/002 |
| GB | 2488981 A * | 9/2012 | | D06F 95/002 |
| WO | WO-9858116 A1 * | 12/1998 | | D06F 95/002 |
| WO | WO-2020150406 A1 * | 7/2020 | | B62B 3/025 |

\* cited by examiner

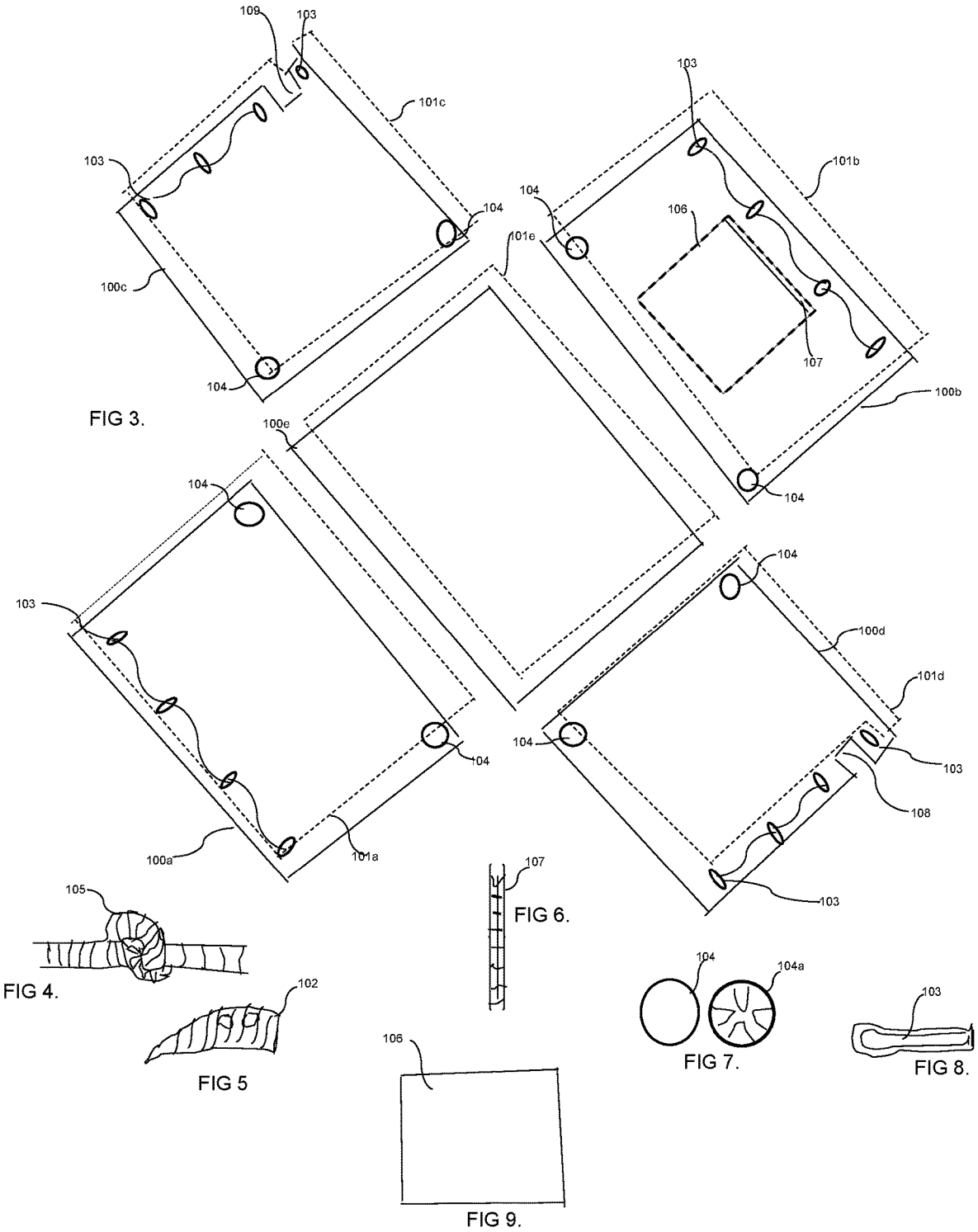

CANVAS LAUNDROMAT HAMPER FOR SHOPPING CART

BRIEF DESCRIPTION OF DRAWINGS

FIG. 3 Is a fragmentary perspective view of the Canvas Laundromat Hamper for Shopping Cart of FIG. 2

FIG. 4 Golden color rope fragmented from FIG. 3

FIG. 5 brown color button fragmented from FIG. 3

FIG. 6 Beige color zipper fragmented from FIG. 3

FIG. 7 Gold color eyelet fragmented from FIG. 3

FIG. 8 Beige color buttonhole fragmented from FIG. 3

FIG. 9 Canvas pocket fragmented from FIG. 3

The description above is intended by way of example only and is not intended to limit the present invention in any way except as set forth in the following claims.

No new Matter.

DETAILED DESCRIPTION OF THE INVENTION

The present invention is described in the following examples, which may represent more than one embodiment of the present invention.

Figure 1:
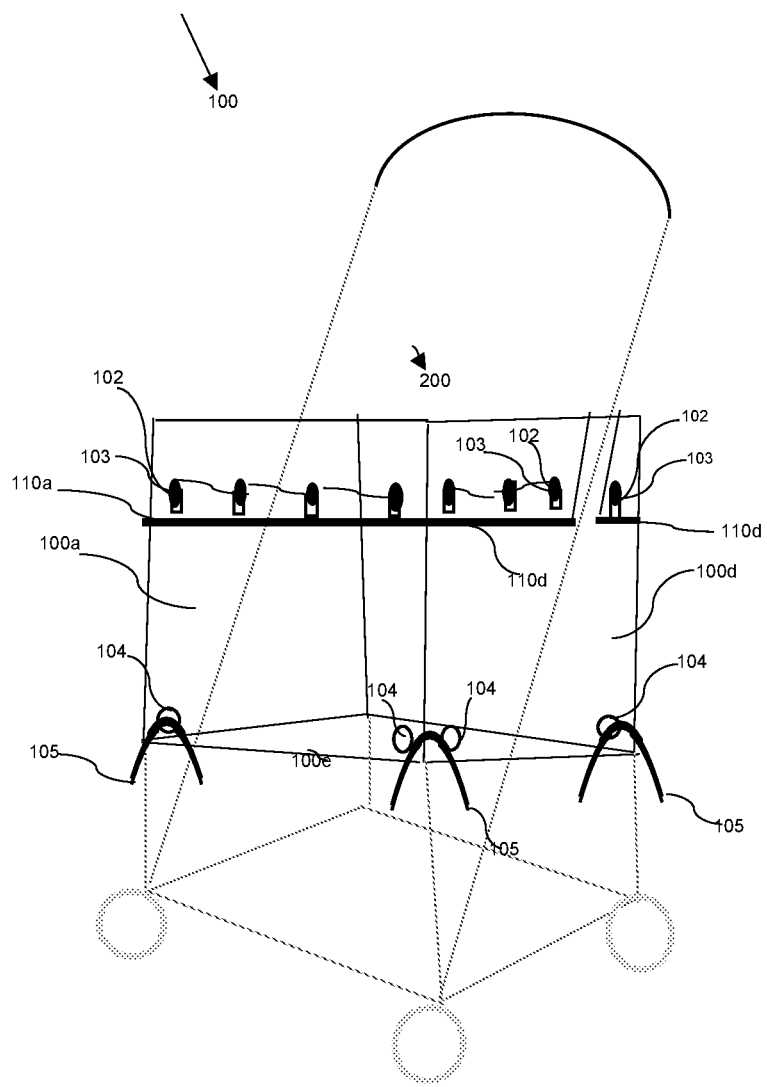
FIG. 1 Is an overall view of the Canvas Laundromat Hamper for Shopping Cart in the shopping cart in accordance with the present invention.

In reference to drawings as shown in FIG. 1, is the complete view 100, of the Canvas Laundromat Hamper in the shopping cart. The Canvas Laundromat Hamper has five panels sewn together and forms an opening 200 at the top periphery for access and made in accordance with the present invention, which has a front panel 100a, that extend to the top periphery and form a natural fold that goes over the outside to form a flap 110a that secures the hamper to the shopping cart with buttons 102, through buttonholes 103, a rear panel 100b that extend to the top periphery and form a natural fold that goes over to the outside to form a flap 110b, that secures the hamper to the shopping cart with buttons 102, going through buttonholes 103, a the pocket 106 with the zipper 107, is sewn into the outer wall 101b and the rear panel 100b, a right panel 100c that is extended and form a natural fold that goes over that top periphery to the outer side to form a flap 110c that secures to the shopping cart with the buttons 102 going through buttonholes 103 the left panel 100d that is extended to form a natural fold that goes over the top periphery to the outer side to form a flap 110d, that secures to the shopping cart with the buttons 102 going through buttonholes 103, a bottom panel 100e, forms the base of the canvas laundromat hamper, which ends midway from the top of the shopping cart. At the bottom corners at each end of each side panel from 100a-100d, twisted beige color fashion rope 105 going through gold color grommet/eyelets 104/104a, 104 male, 104a female spurs studs.

Figure 2:
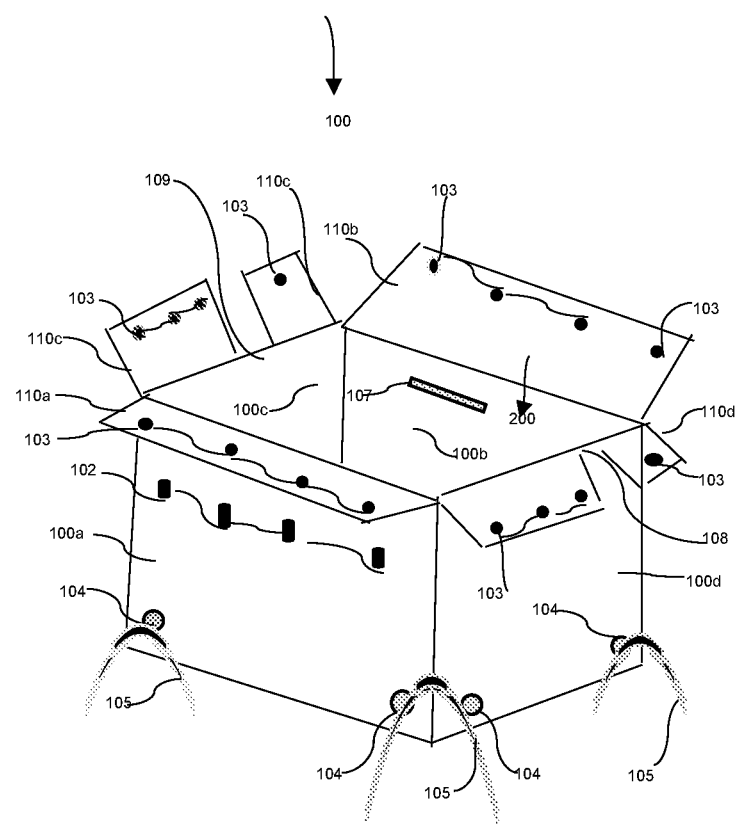
FIG. 2 Is a top view of the Canvas Laundromat Hamper for shopping Cart outside the shopping cart of FIG. 1

FIG. 2 Shows the top view of the canvas hamper 100, outside of the shopping cart with an opening 200 at the top canvas hamper, with visible panels 100a-100d that folds/flaps 110a-110d opened, and two sides with notches visible 108, 109, lift side 109 notch and right side 108 notch which is the allowance for the handle of the cart and the sides left 108 and right 109 with buttonholes 103.

FIG. 3 is a fragmented view of the Canvas Laundromat Hamper for Shopping Cart 100, showing the elevated view of the outer walls 101, and the view of the five panels 100a-100e separated including the outer walls 101a-101e which is identical to the main panels 100a-100e before sewn together, the back panel outer walls 101b has a shows the pocket 106 sewn in with a zipper 107 for access.

The left panel 100d/101d has a notch 108 left side, to accommodate the handle of the shopping cart, the right panel 100c/101c has a notch 109 right side to accommodate the handle of the shopping cart. The bottom corners of the front, rear, right and left panels with the gold color grommets/eyelets 104 male, 104a female, male/female parts 104/104a, the pocket 106, with zipper 107, beige color fashion rope 105, brown buttons 102, and buttonholes 103, on the front, rear, right and left panels the flaps.

FIG. 4 Golden color rope 105, fragmented from FIG. 3

FIG. 5 Brown color button 102, fragmented from FIG. 3

FIG. 6 Beige color zipper 107, fragmented from FIG. 3

FIG. 7 Gold color eyelet 104, 104a fragmented from FIG. 3

FIG. 8 Beige color buttonhole 103, fragmented from FIG. 3

FIG. 9 Canvas pocket 106, fragmented from FIG. 3

The embodiments thereof illustrated in the accompanying Figures and/or described herein are merely exemplary and are not meant to limit the scope of the invention. It is to be appreciated that the invention has been contemplated as would be obvious to one of ordinary skill in the art with the benefit of this disclosure. Rather, the scope and breadth afforded this document should only be limited by the claims provided herein while applying either the plain meaning to each of the terms and phrases in the claims or the meaning clearly and unambiguously provided in this specification.

What is claimed is:

1. A Canvas Laundromat Hamper for a shopping Cart comprising:
    a vertical rectangle enclosure having an opening at a top periphery, wherein the vertical rectangle enclosure comprises a front panel, a rear panel, a right panel, a left panel, and a bottom panel;
    a first flap on the front panel, a second flap on the rear panel, a third flap on the right panel, and a fourth flap on the left panel, wherein the first flap, the second flap, the third flap, and the fourth flap are front, rear, right and left panels going over the top periphery, wherein each of the third flap and the fourth flap are discontinuous and comprises a notch to accommodate a handle of the shopping cart, and wherein the notch divides each of the third flap and the fourth flap into two parts;
    the first flap, the second flap, the third flap, and the fourth flap secure to the outer walls of the front, rear, right and left panels with buttons;
    the bottom panel having four bottom corners with spur grommets/eyelets punched adjacently;
    twisted fashion rope to go through the spur grommet/eyelets, to secure the canvas laundromat hamper inside, at midway from the top periphery, inside the shopping cart;
    a pocket for dryer sheets sewn into the outer wall of the rear panel; and
    the Canvas laundromat hamper extends only midway inside the shopping cart for comfort.

2. The Canvas Laundromat Hamper for Shopping Cart according to claim 1, wherein the hamper is made from canvas fabric that is Foldable, washable and dryer safe.

3. The Canvas Laundromat Hamper for shopping Cart according to claim 1, wherein it is private use for each user to prevent the user from putting their clean clothes into a dirty laundromat hamper someone just dumped in their dirty laundry.

4. The Canvas Laundromat Hamper for Shopping Cart according to claim 1, wherein hamper contains the pocket with zipper access inside the rear panel.

5. The Canvas Laundromat Hamper for Shopping Cart according to claim 1, wherein the vertical rectangle enclosure comprises the opening at the top periphery for receiving laundry from washing machine and dryer, respectively.

6. The Canvas Laundromat Hamper for Shopping Cart according to claim 1, wherein the front, rear, right, left and bottom panels are sewn together to make the laundry hamper.

7. The Canvas Laundromat Hamper for Shopping Cart according to claim 1, wherein the front, rear, right, and left panels are extended over the top periphery to form the four flaps over the outer sides of the shopping cart.

8. The Canvas Laundromat Hamper for Shopping Cart according to claim 1, wherein the four flaps are secured to the outside of the panels with brown color buttons through buttonholes.

9. The Canvas Laundromat Hamper for shopping Cart according to claim 1, wherein the four bottom corners are punched with the gold color spur grommets/eyelets.

10. The Canvas Laundromat Hamper for Shopping Cart according to claim 1, wherein the twisted fashion rope ties the four bottom panels corners at the bottom corners of the hamper to shopping cart.

11. The Canvas Laundromat Hamper for Shopping Cart according to claim 1, wherein the pocket is sewn into the outer wall of the back panel for dryer sheets or whatever deems necessary.

12. The Canvas Laundromat Hamper for Shopping Cart according to claim 1, the canvas laundromat hamper extending only midway in shopping cart interior, this eliminated reaching to floor of the shopping cart to retrieve laundry.

13. The Canvas Laundromat Hamper for Shopping Cart according to claim 1, wherein the notch is located in proximity to the rear panel.

14. The Canvas Laundromat Hamper for Shopping Cart according to claim 1, wherein the notch is located at a first distance from the front panel, and at a second distance from the rear panel, and wherein the first distance is greater than the second distance.

15. The Canvas Laundromat Hamper for Shopping Cart according to claim 1, wherein each of the third flap and the fourth flap extends from the front panel to the rear panel.

16. The Canvas Laundromat Hamper for Shopping Cart according to claim 1, wherein bottom corners of each of the front panel, the rear panel, the right panel, and the left panel comprise spur grommets/eyelets.

* * * * *